Dec. 31, 1935.  J. M. DEVERS  2,026,022
CANNING APPARATUS
Original Filed June 30, 1930  2 Sheets-Sheet 1
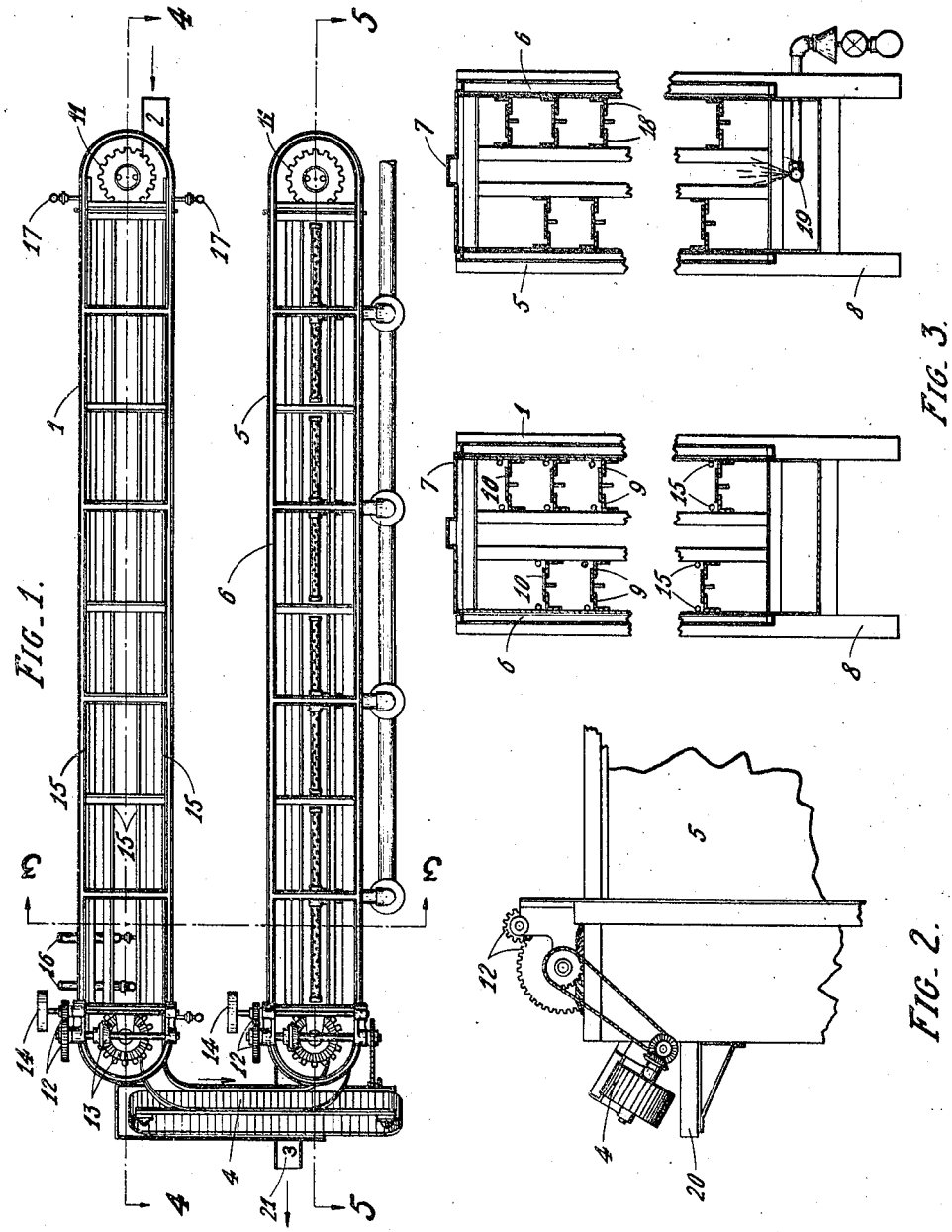
INVENTOR.
John M. Devers.
BY
ATTORNEYS.

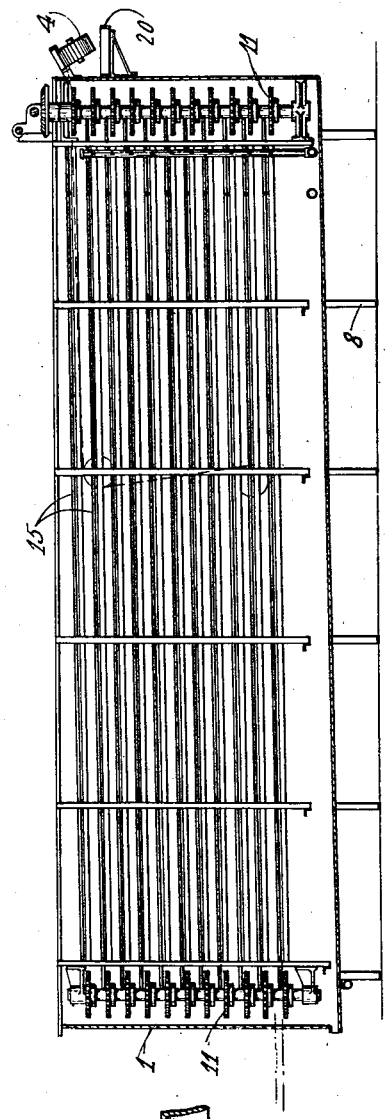
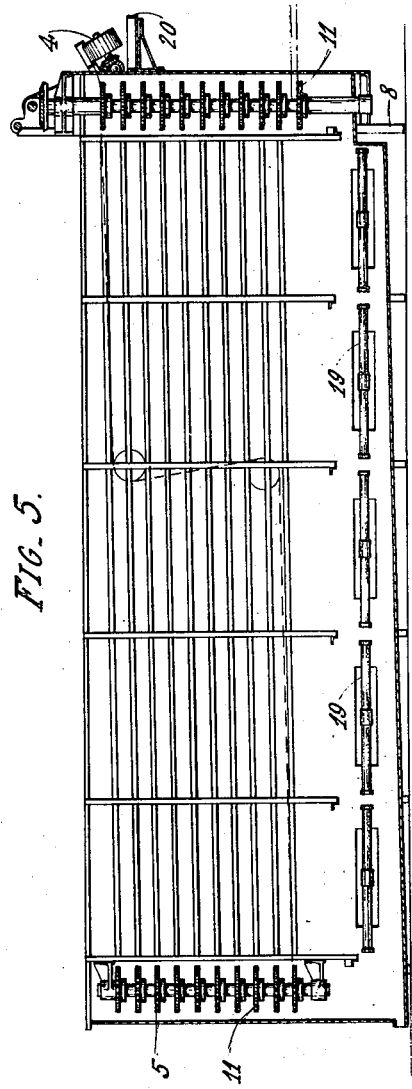
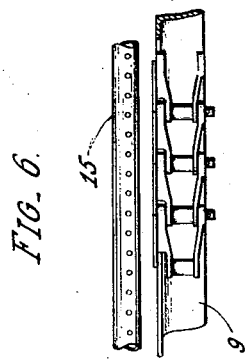

Patented Dec. 31, 1935

2,026,022

UNITED STATES PATENT OFFICE 2,026,022

CANNING APPARATUS

John M. Devers, Riverside, Calif., assignor to Food Machinery Corporation, San Jose, Calif., a corporation of Delaware Original application June 30, 1930, Serial No. 464,982. Divided and this application July 21, 1930, Serial No. 469,515. Renewed May 31, 1935

5 Claims. (Cl. 99—2)

This invention relates to the art of canning comestibles and has particular reference to a process and apparatus for treating fish and the like, preparatory to canning them for the market.

A most important matter in the art of canning fish is to preserve them in such manner that they maintain their shape and consistency and thus present a wholesome and appetizing appearance to the consumer. This is difficult of achievement. The cans of fish are almost invariably subjected to more or less rough treatment during their shipment to the market, so that the fish tend to disintegrate into a mushy, formless mass. Moreover, it is not unusual for them to stand for many months, awaiting the final consumer and during this period, the sauce, with which the fish are commonly covered, and whatever water and oil have not been removed, thoroughly soak through the fish, causing further deterioration. Also, the sauce loses its color and consistency by reason of dilution and mixture with the water, oil and particles of fish, thus increasing the already unpleasant appearance.

Another important matter, particularly in the case of oily fleshed fish, such as sardines, is the elimination of as much oil as possible, for the reason that the fish oil is regarded by many people as offensive to the taste and renders the fish unpalatable. The recovery of the oil thus eliminated is also an important factor in reducing the cost of production since the fish oil is in great demand and finds a ready market. It is also highly desirable that the water content be reduced to a minimum, as it detracts from the flavor. Such reduction of the oil and water content not only serves to increase the palatability, but also aids the appearance, since it diminishes the destructive effects of rough treatment and delayed consumption.

In order to accomplish these results, it has been the almost universal practice in the past to subject the fish to a drying process, whereupon they are fried in oil or brine for a short time, at a high temperature. The preliminary drying process serves to prevent the generation of steam in the cells of the fish during the subsequent heat treatment, which might rupture the flesh and skin. After being fried, the fish are placed in suitable baskets and allowed to stand until the excess oil has drained away, and they are then passed through an exhaust box where they are subjected to steam treatment.

The frying process is for the purpose of rendering them firm fleshed and eliminating a small portion of the oil and water while the steam treatment is for the purpose of further reducing the oil and water content. Obviously, such a process cannot eliminate a very large proportion of the oil and water from the fish but it does eliminate a small portion of it and makes them firm fleshed so that a suitable sauce may be poured over them and they will stand up over long periods of time, regardless of rough handling.

The objection to fish canned by this method is that the frying and drying process destroys their flavor to a greater or lesser extent. This is due to repeated use of the frying oil which soon becomes rancid, and the exposure of the fish to the atmosphere during the subsequent draining process which increases their rancidity. Moreover, this process sears and hardens the skins, thus strengthening the multitude of oil cells which lie just beneath the skin on the under side of the fish, and which hold a large proportion of the oil. The steam treatment which follows cannot break down many of these cells whereby to liberate the oil nor does it reduce the water content to the desired degree, due to the low temperature and humid atmosphere. The result is a product which withstands rough treatment, but which has a decidedly inferior flavor.

It has recently been proposed to pack the fish in cans without any preliminary frying operation but although this has been found to improve the flavor in a large measure, the fish so treated are not firm fleshed enough to keep their shape, but due to the considerable amount of oil and water left in them, together with the sauce in which they are commonly packed, they soon deteriorate into a mushy mass, which is not only unsightly, but unpalatable as well.

I have disclosed in my copending application Serial No. 464,982 filed June 30, 1930 of which this application is a division, a novel method of treating fish whereby I am enabled to dispense with the preliminary drying, frying, and draining process and yet secure a product which is deliciously flavored and pleasing in appearance, and which will retain those desirable characteristics over long periods of time, regardless of rough treatment. I am also enabled to reduce the cost of production materially since by dispensing with these operations I also dispense with the apparatus necessary for their performance as well as the expense of operating them. Moreover, as will be seen, I am enabled to recover a greater quantity of oil than formerly, whereby the cost of production is further reduced.

In the practice of my method the fish are prepared in the usual manner, by butchering and cleaning and are then passed through a brine solution, in order to firm and sweeten them. They are then packed in cans containing a quantity of brine or water to prevent sticking and subjected to heat at a relatively moderate temperature, that is to say, a temperature which is high enough to raise the temperature of the fish substantially in preparation for a second heat treatment, which I shall describe later, and yet low enough to avoid searing.

I preferably subject the fish to direct contact with live steam, as in this way a higher temperature can be secured without the danger of searing, due to the humid atmosphere. It will be obvious that such temperature must be selected with a view to the kind of fish undergoing treatment, and other surrounding conditions, but for California sardines, I have found that a temperature of approximately 210° F., is productive of best results when applied for a period of approximately 20 minutes in a humid atmosphere. It is undesirable to attempt to cook the fish at this stage by reason of the fact that they must be thoroughly cooked after the cans are closed in order to sterilize them and overcooking must be avoided. It is also important that the heat applied at this stage be not too high as it has been found that if the cold fish are suddenly subjected to a high temperature, the skin and flesh sear over, thus imprisoning more or less oil and water in the fish and preventing their escape.

I have also found it to be advantageous that the heat treatment be applied at a substantially uniform temperature since, in this manner, the fish are thoroughly heated to a sufficiently high temperature without searing, in a minimum of time.

It will be seen that the result of this heat treatment is to drive off a portion of the oil and water content as well as to thoroughly heat the fish preparatory to subjecting them to a second more intense heat treament.

Following this preliminary heat treatment, the cans of fish are partially drained and then subjected to a relatively high temperature, that is to say, a temperature which is sufficiently high to sear the fish. This temperature must also be selected according to the kind of fish being treated and other surrounding conditions, but for California sardines, I have found that temperatures ranging from 285° F. to 400° F. are satisfactory.

I preferably drain the cans only partially prior to the second heat treatment, since a little liquid left in the cans serves to prevent the fish from burning and sticking to the cans.

The purpose of this treatment being to drive off a majority of the oil and water content of the fish, it is important that the surrounding atmosphere be dry instead of humid, as in the first treatment. A dry heat must therefore be supplied. The high temperature drives off the water content almost immediatly and also breaks down the oil cells which lie just under the skin of the fish, liberating the oil. The temperature is now gradually reduced. The length of time and the amount of reduction will, of course, depend on the kind of fish being treated and other surrounding conditions, but I have secured satisfactory results with California sardines by gradually reducing the temperature over a period of approximately 15 minutes to a minimum of from 185' to 250°. During this period, the flesh of the fish becomes firm and the skin tends to stiffen and adhere to the flesh more readily. After this change has taken place, the fish will not readily absorb moisture, so that any liquid introduced into the cans leaves the fish unaffected. The gradual reduction of the temperature serves to prevent the temperature of the oil liberated from the fish from rising as high as the initial temperature to which the fish are subjected in this treatment, and this avoids oxidation of the oil which causes it to turn rancid.

I have said that the fish are suddenly subjected to a maximum temperature at the beginning of the second heat treatment and this is for the reason that the sudden application of the high heat liberates oil and drives off the water before searing occurs. It is obvious, however, that the temperature may be gradually increased from that applied in the first treatment to the maximum applied in the second, although the results obtained are not so satisfactory.

After the second heat treatment, the cans are completely drained and a suitable sauce introduced, if desired. The cans are then closed and retorted in the customary manner.

I have found that by using my method, I am able to recover a minimum of one-half ounce per can more oil than can be recovered by prior methods, and also eliminate one and one-half ounce per can more water.

It will be understood that my method is not necessarily limited to the treatment of fish, but may be useful in the treatment of other like comestibles, and particularly those meats or fleshes containing more or less oil, and I, therefore, consider myself entitled to all such uses as fall within the scope of the claims hereto appended.

It is the principal object of this invention to provide an apparatus suited to the carrying out of my novel process of treating fish and the like preparatory to canning whereby a majority of the oil and water content is driven off and at the same time they are rendered firm fleshed and palatable.

It is another object to provide an apparatus for treating fish and the like, comprising a pair of exhaust boxes through which the fish successively pass, and which are provided with means for maintaining different temperatures in the boxes, and means for draining the fish as they pass from one box to the other.

A further object is to provide an apparatus for treating fish and the like wherein the fish receive successive heat treatments, one of which is relatively moderate and applied in a humid atmosphere, and another of which is applied at graduated temperatures in an unhumidified atmosphere.

Another object is to produce an apparatus of this nature which is efficient and cheap as well as simple and durable.

Further objects and advantages which have not been recited heretofore will become apparent as the description proceeds in connection with the accompanying drawings, in which, Fig. 1 is a top view of the assembled apparatus, with the covers removed. For the sake of clarity, I have also omitted the conveyor chains for conveying the cans through the exhaust box.

Fig. 2 is a side view of the left-hand end of the apparatus showing the draining means.

Fig. 3 is a sectional view taken along the line 3—3 of Fig. 1.

Fig. 4 is a sectional view taken along the line 4—4 of Fig. 1.

Fig. 5 is a sectional view taken along the line 5—5 of Fig. 1.

Fig. 6 is a detail showing a section of one of the steam pipes showing the perforations therein, through which steam is ejected on to the cans during their passage through the first exhaust box.

Referring to Fig. 1, an exhaust box 1 is shown in which the fish receive their initial heat treatment. The cans of fish enter at 2 and discharge at 3 to the conveyor-drainer 4, which partially drains the cans and then feeds them to the exhaust box 5, where the second heat treatment is applied.

The exhaust boxes 1 and 5 are identical to that shown in United States Patent No. 1,736,891, issued Nov. 26, 1929, to A. R. Thompson, with the exception of certain changes hereinafter pointed out, which are made necessary in order to carry out my process. Since the construction and operation of these boxes is fully set forth in said patent, it is not believed to be necessary to go into the details of their construction except insofar as their construction and operation are involved in the practice of my invention.

Referring to Figures 1, 3 and 4, the exhaust box 1 comprises a casing 6, having a cover 7 and supported by legs 8. Within the casing is a conveying means which operates to convey the cans through the box along a helical course. This means includes the spaced tracks 9, which extend longitudinally of the box on either side. The rails which receive the cans as they enter the box have a gradual upward slant from the receiving end of the box to the other end. The return rails on the opposite side of the box slant upwardly toward the receiving end of the box. The next rails are immediately above the receiving rails and slant in the same direction, and so on; the rails providing a helical pathway through the box from the lower part of the box at the receiving end to the outlet at the upper part of the discharge end. Moving upon these rails is the endless conveyor 10 which passes around the sprockets 11 at each end of the box. The sprockets 11 are driven through the medium of the gears 12 and 13, and the pulley 14, which may be connected to any suitable source of power.

Perforated steam pipes 15 are disposed above the rails 9 and parallel thereto in such manner that live steam is ejected through the perforations against the cans during their discharge and also serve to guide the cans and prevent them from being dislodged from the conveyor. The pipes 15 are plugged at each end and steam is fed to them by means of the pipes 16 and 17.

The exhaust box 5 is similar to the box 1 except that the steam pipes are omitted, the rails 18 are inverted, and means for supplying a dry heat to the box is provided. This means consists of the gas burners 19 which are placed in the bottom of the box. It will be noted that the cans are transported through this box in a reverse direction; that is to say, they are fed into the receiving end at the top of the box and descend along a helical course, whereas in the box 1 the cans are fed at the bottom of the box and ascend in a helical course.

An endless conveyor 4 serves to receive the cans as they emerge from the exhaust box 1 and transfers them to an exhaust box 5. During their transfer between the boxes, the cans are partially drained due to the conveyor being disposed at an angle to the horizontal, as shown. The liquid which is thus drained from the cans is received by the pans 20, which may be emptied from time to time as required, so that the oil may be recovered.

In operation, the fish are first prepared in the usual manner by butchering and cleaning and are then passed through a brine solution in order to firm and sweeten them. They are then packed in cans containing a quantity of brine or water to prevent sticking and passed through the exhaust box 1.

It will be noted that due to the construction of this box and the heating means therefor, that a substantially uniform temperature is maintained throughout the box and the atmosphere is also humidified. The cans of fish, during their discharge through the box, are subjected to the action of live steam issuing from the perforations in the steam pipes 15, which thoroughly heats the fish, preparatory to the second heat treatment, but does not sear them by reason of the humid atmosphere and relatively moderate temperature. This heat treatment also liberates a substantial amount of oil and water from the fish.

As the cans of fish emerge from the first exhaust box, they are received by the conveyor 4 which partially drains them of their contents, the oil thus recovered being an added source of revenue, thus effecting a substantial saving of expense.

After being drained, the cans are conveyed to the second exhaust box 5 where they enter at the top and pass through in a gradually descending helical path. Due to the dry heat supplied by the burners 19, the atmosphere of this box is kept dry and it will be seen that the temperature in the box is highest at the top where the cans enter, due to the accumulation of heat at that point. As the cans enter the box, they are suddenly subjected to a high heat which liberates the majority of the oil remaining in the fish and then sears them enough to prevent the re-entrance of moisture or oil. As the cans descend along the helical pathway into the lower part of the box they are subjected to a gradually decreasing temperature. During this period, the fish become firmer and the skin slightly hardens and adheres to the flesh.

The cans emerge from the box 5, at 21, and may then be drained and closed after which they are placed in a suitable retort and sterilized in the customary manner. A suitable sauce may be introduced into the cans before closing, if desired.

Having thus described my invention, what I claim as new and desire to protect by Letters Patent, is:—

1. In an apparatus for treating fish to recover oil therefrom while preparing them for canning, the combination of a pair of can heating chambers for heating fish in open cans, means for maintaining a degree of wet heat in the first of said chambers sufficient to liberate oil from the fish without searing them, means for maintaining a degree of dry heat in the second of said chambers sufficient to sear the fish, and means for conveying the cans of fish successively through said chambers from the inlet of the first heating chamber to the outlet of the second chamber and positioned to discharge oil from the cans during their passage between the first and second chambers.

2. In an apparatus for treating fish to recover oil therefrom while preparing them for canning, the combination of a pair of can heating chambers for heating fish in open cans, a can inlet and a can outlet in each of said chambers, means for maintaining a degree of wet heat in the first of said chambers sufficient to liberate oil from the fish without searing them, means for maintaining a degree of dry heat in the second of said chamber sufficient to sear the fish, a canway extending through said chambers from the inlet of the first heating chamber through a series of spiral convolutions to the outlet of the second chamber, said canway being disposed in tilted position intermediate the outlet and inlet of the first and second chambers, respectively, to discharge oil from cans being conveyed thereover, and means for moving cans along said canway from the inlet of the first heating chamber to the outlet of the second chamber.

3. In an apparatus for treating fish to recover oil therefrom while preparing them for canning, the combination of a pair of can heating chambers for heating fish in open cans, a can inlet and a can outlet in each of said chambers, means for maintaining a substantially uniform degree of wet heat throughout said first chamber sufficient to liberate oil from the fish without searing them, means for applying a gradually diminishing dry heat to cans passing through the second chamber from a maximum at their point of entry sufficient to sear the fish to a minimum at the point of discharge, a continuous canway for guiding the cans of fish through said chambers from the inlet of the first heating chamber to the outlet of the second chamber and positioned to tilt them to discharge oil therefrom during their travel between the outlet of the first chamber and the inlet of the second, and means for conveying cans along said canway through said first and second chambers successively.

4. In an apparatus for treating fish to recover oil therefrom while preparing them for canning, the combination of a can heating chamber for heating fish in open cans, means for maintaining a degree of wet heat in said chamber sufficient to liberate oil from the fish without searing them, a second can heating chamber for heating fish in open cans, a can inlet and a can outlet in each of said chambers, a spiral canway within said heating chambers extending successively therethrough from the inlet of said first chamber in a series of spiral convolutions to the outlet of the second chamber, heating means disposed in the lower portion of said second chamber beneath the canway for applying a gradually diminishing dry heat to cans passing along the canway from a maximum at the inlet sufficient to sear the fish to a minimum at the outlet, and means for moving the cans of fish along said canway from the outlet of the first heating chamber to the inlet of the second chamber and simultaneously tilting them to discharge oil therefrom.

5. In an apparatus for preparing fish for canning, the combination of a heating chamber, means for subjecting open cans of fish to wet heat of substantially uniform temperature from the point of their introduction into said chamber to the place of discharge therefrom, a second heating chamber, means for subjecting the fish to dry heat of gradually diminishing temperature from the point of their introduction into said second chamber to the point of their discharge therefrom, a continuous canway along which the cans of fish are passed through the first and second chambers successively, said canway being positioned to partially invert the cans during their travel from the outlet of the first chamber to the inlet of the second chamber to drain the oil liberated by the wet heat of said first chamber from the cans, and means for moving cans along said canway from the inlet of the first named chamber to the outlet of the second.

JOHN M. DEVERS.